(12) United States Patent
Maeda et al.

(10) Patent No.: US 10,939,453 B2
(45) Date of Patent: Mar. 2, 2021

(54) VEHICLE AND ON-BOARD COMMUNICATION DEVICES

(71) Applicant: HONDA MOTOR CO., LTD., Tokyo (JP)

(72) Inventors: Yusuke Maeda, Wako (JP); Satoshi Miwa, Wako (JP); Naoko Imai, Wako (JP); Yuto Ayami, Wako (JP); Man chun Wu, Wako (JP); Satoshi Onodera, Tokyo (JP); Hiroyuki Hayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/807,642

(22) Filed: Mar. 3, 2020

(65) Prior Publication Data

US 2020/0296732 A1 Sep. 17, 2020

(30) Foreign Application Priority Data

Mar. 11, 2019 (JP) .............................. JP2019-044159

(51) Int. Cl.
*H04W 72/08* (2009.01)
*H04W 4/44* (2018.01)
(Continued)

(52) U.S. Cl.
CPC ........... *H04W 72/085* (2013.01); *H04W 4/44* (2018.02); *H04W 24/08* (2013.01); *H04W 76/10* (2018.02); *H04W 84/042* (2013.01)

(58) Field of Classification Search
CPC ..... H04W 72/085; H04W 4/44; H04W 76/10; H04W 24/08
See application file for complete search history.

(56) References Cited

U.S. PATENT DOCUMENTS

2012/0094657 A1* 4/2012 Gullapalli ........... H04M 1/6091
455/425
2015/0244805 A1* 8/2015 Hampiholi .............. H04W 4/21
709/217
(Continued)

FOREIGN PATENT DOCUMENTS

WO 2017/159176 A1 9/2017

*Primary Examiner* — Magdi Elhag
(74) *Attorney, Agent, or Firm* — Westerman, Hattori, Daniels & Adrian, LLP

(57) ABSTRACT

A vehicle includes a telematics control unit configured to communicate with a telematics server via a base station, a communication interface for communication with a wireless communication terminal connected to a cellular network, a first obtainment circuit configured to obtain a communication quality of a first communication path for connecting to the telematics server via the telematics control unit and the base station, a second obtainment circuit configured to obtain a communication quality of a second communication path for connecting to the telematics server via the communication interface, the wireless communication terminal, and the cellular network, and a selection circuit configured to select a communication path with a superior communication quality from among the first communication path and the second communication path based on the communication quality of the first communication path and the communication quality of the second communication path.

16 Claims, 7 Drawing Sheets

(51) Int. Cl.
*H04W 76/10* (2018.01)
*H04W 24/08* (2009.01)
*H04W 84/04* (2009.01)

(56) References Cited

U.S. PATENT DOCUMENTS

2015/0319630 A1* 11/2015 Kerberg ................ H04B 7/082
 370/252
2018/0270876 A1* 9/2018 Ding .................... H04W 8/005
2018/0317067 A1* 11/2018 Ameixieira ........... H04W 60/00

* cited by examiner

VEHICLE AND ON-BOARD COMMUNICATION DEVICES

CROSS-REFERENCE TO RELATED APPLICATION(S)

This application claims priority to and the benefit of Japanese Patent Application No. 2019-044159 filed on Mar. 11, 2019, the entire disclosure of which is incorporated herein by reference.

BACKGROUND OF THE INVENTION

Field of the Invention

The present invention relates to a vehicle and an on-board device.

Description of the Related Art

With the advancement of wireless communication networks, telematics services that provide, for instance, information necessary for automated driving to a vehicle, such as a connected car, are expected to disseminate (International Publication No. WO2017/159176). A vehicle is provided with a TCU (telematics control unit), which communicates with a telematics server via a telematics base station. A user uses a telematics service by making a contract with a company that provides the telematics service (an automobile manufacturer or its affiliated company). In general, the telematics service is considered a flat-fee service that is not dependent on the amount of communication.

Incidentally, a vehicle runs through a variety of areas, such as urban areas and rural areas. While the vehicle is on the move, the communication quality of a wireless line between the TCU and the telematics base station changes frequently. At times, the TCU may become incapable of communicating with the telematics base station.

Meanwhile, the user has a user terminal, such as a smartphone, capable of communicating with a cellular communication network. As such a smartphone has a tethering function, it can operate as a relay device (an access point) for other wireless communication apparatuses. Therefore, if the vehicle can communicate with the telematics server via the smartphone and the cellular communication network when the communication quality of the wireless line between the TCU and the telematics base station has dropped, the user would be able to continuously receive the telematics service and enjoy its convenience. In view of this, an aspect of the present invention improves convenience for a user who uses a telematics service.

SUMMARY OF THE INVENTION

According to an embodiment, a vehicle is provided. The vehicle includes: a telematics control unit configured to communicate with a telematics server via a base station; a communication interface for communication with a wireless communication terminal connected to a cellular network; a first obtainment circuit configured to obtain a communication quality of a first communication path for connecting to the telematics server via the telematics control unit and the base station; a second obtainment circuit configured to obtain a communication quality of a second communication path for connecting to the telematics server via the communication interface, the wireless communication terminal, and the cellular network; and a selection circuit configured to select a communication path with a superior communication quality from among the first communication path and the second communication path based on the communication quality of the first communication path obtained by the first obtainment circuit and the communication quality of the second communication path obtained by the second obtainment circuit.

DESCRIPTION OF THE EMBODIMENTS

Figure 1:
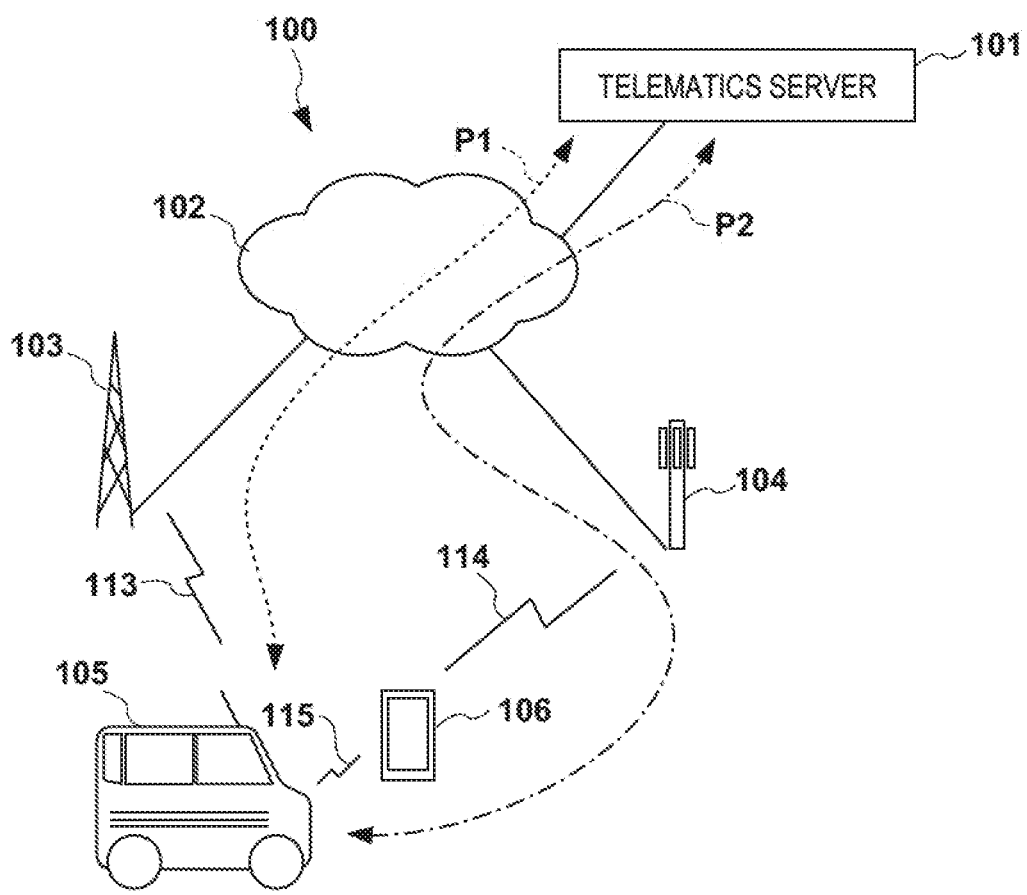
FIG. 1 is a diagram showing a telematics system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Telematics System

FIG. 1 shows a telematics system 100 that provides a telematics service to a vehicle. A telematics server 101 provides the telematics service to a vehicle 105 via a network 102, such as the Internet. The telematics service is a service that provides information used by the vehicle (e.g., map information, traffic information, image/moving image information obtained by another apparatus, surrounding environment information necessary for automated driving), entertainment information (e.g., moving images and music), and/or communication with another communication terminal (e.g., SNS, SMS, telephone call, and videophoning). In general, the telematics service is a service that is managed by an automobile manufacturer, its affiliated company, a mobile communication operation, and the like. A telematics base station 103 is connected to the network 102. The telematics base station 103 transmits information of the telematics service provided by the telematics server 101 to the vehicle 105 by executing wireless communication with the vehicle 105. A wireless line 113 is a wireless line that connects the telematics base station 103 and the vehicle 105. A first communication path P1 is a communication path that connects the vehicle 105, telematics base station 103, network 102, and telematics server 101. The vehicle 105 may be referred to as a connected car. Furthermore, the vehicle includes, but is not limited to, not only a four-wheeled vehicle but also a two-wheeled vehicle, a train, a service vehicle, an aircraft, a drone, and the like.

Incidentally, a user (a driver or a passenger) of the vehicle 105 generally has a cellular communication terminal (a wireless communication terminal, a user terminal), such as a smartphone 106. The smartphone 106 connects to a cellular base station 104 via a wireless line 114. The cellular base station 104 is also connected to the network 102 and can communicate with the telematics server 101. In general, the smartphone 106 has a tethering function. The tethering function is a function whereby the smartphone 106 performs relay between another communication apparatus, such as the vehicle 105, and a cellular network. The vehicle 105 connects to the smartphone 106 via a wireless line 115. That is to say, the vehicle 105 can communicate with the telematics server 101 via the wireless line 115, smartphone 106, wireless line 114, cellular base station 104, and network 102. A second communication path P2 is a communication path that connects the vehicle 105, smartphone 106, cellular base station 104, network 102, and telematics server 101.

The telematics base station 103 may also be a cellular base station. In this case, a communication company that provides the cellular base station functioning as the telematics base station 103 may not match a communication company that provides the cellular base station 104. Therefore, the communication quality of the first communication path P1 does not match the communication quality of the second communication path P2. Even if the telematics base station 103 and the cellular base station 104 are operated by the same communication company, the communication quality of the first communication path P1 may not match the communication quality of the second communication path P2. For example, when the telematics base station 103 is a base station of a 4G communication method and the cellular base station 104 is a base station of a 5G communication method, their communication qualities may not match. Furthermore, even if their communication methods match, when a wireless communication band of the telematics base station 103 (e.g., 6-GHz band) is different from a wireless communication band of the cellular base station 104 (e.g., 20-GHz to 30-GHz band), their communication qualities may still not match.

On-Board Device 200

Figure 2:
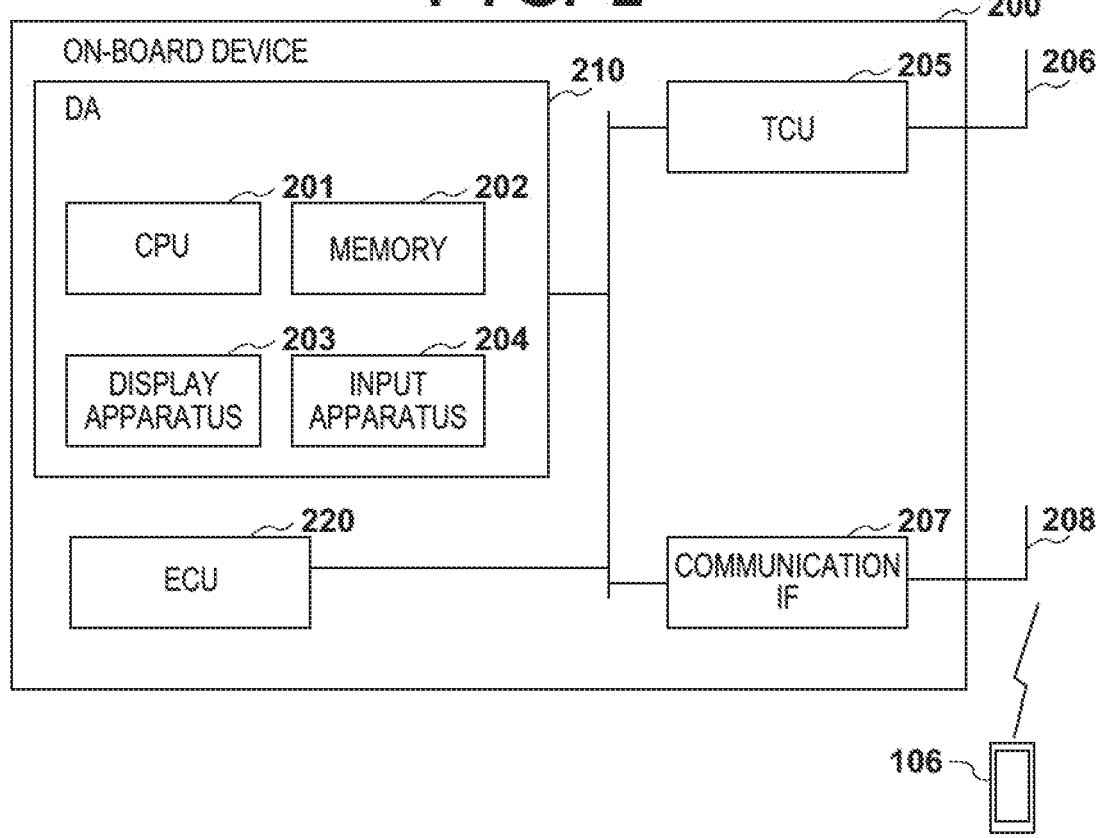
FIG. 2 is a diagram showing an on-board device.

FIG. 2 shows an on-board device 200 that is mounted on and fixed to the vehicle 105. In general, the on-board device 200 is screwed to the vehicle 105 in an assembly process of the vehicle 105. Therefore, the on-board device 200 is a communication apparatus that is different from a user terminal, for instance the smartphone 106, that can be easily carried to the outside of the vehicle by the user. A TCU 205 is a telematics control unit that communicates with the telematics server 101, which provides the telematics service, via the telematics base station 103. An antenna 206 is a transmission/reception antenna for wireless communication with the telematics base station 103. A communication IF 207 is a communication interface for communication with the smartphone 106. The communication IF 207 may be a wireless communication interface, such as Wi-Fi and Bluetooth®, or may be a wired communication interface, such as a USB interface. An antenna 208 is an interface for communication with the smartphone 106.

A DA 210 is an infotainment unit that outputs information provided from the telematics server 101 to a display apparatus 203, and transmits information input from an input apparatus 204 to the telematics server 101. A CPU 201 executes a control program stored in a memory 202. For example, the CPU 201 selects whether to connect to the telematics server 101 via the TCU 205, or to connect to the telematics server 101 via the communication IF 207. The memory 202 includes a RAM and a ROM. An ECU 220 is an electronic control unit. The ECU 220 may also be configured to be capable of communicating with the telematics server 101 via the TCU 205 and the communication IF 207.

Functions of CPU

Figure 3:
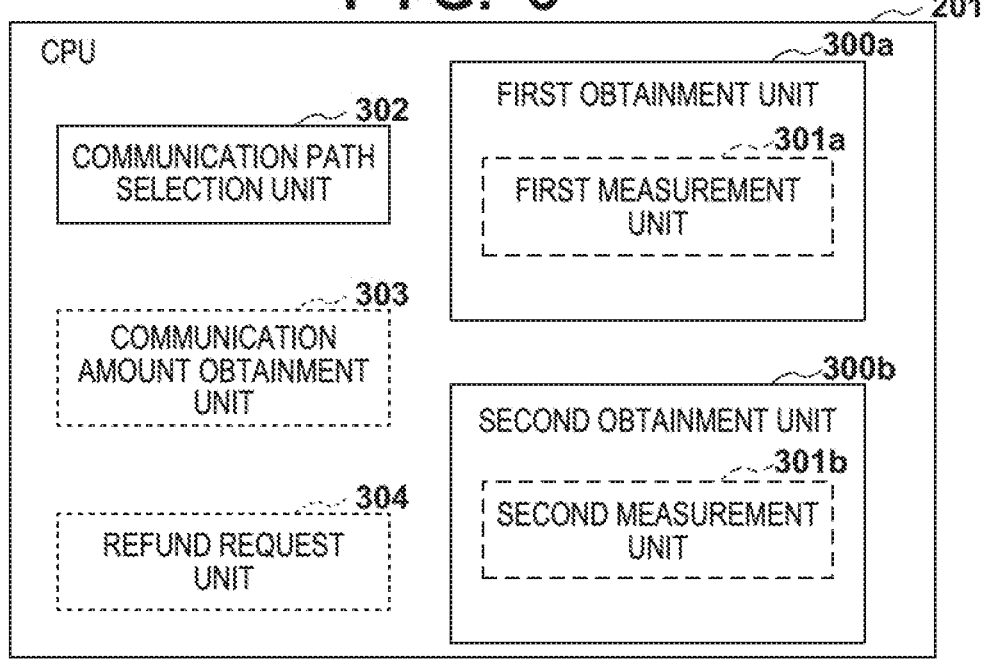
FIG. 3 is a block diagram showing the functions of a CPU.

FIG. 3 shows the functions of the CPU 201. A first obtainment unit 300a obtains the communication quality of the first communication path P1 for connecting to the telematics server 101 via the TCU 205 and the telematics base station 103. Note that the first obtainment unit 300a may include a first measurement unit 301a that measures the communication quality of the first communication path P1. The first measurement unit 301a may measure a round-trip communication period (round-trip time) of the first communication path P1 using, for example, ping. Alternatively, the first measurement unit 301a may receive a certain amount of data for speed measurement from the telematics server 101 to measure a communication period or a communication speed (or throughput) required for the reception. The first obtainment unit 300a may receive, from the telematics server 101, quality information indicating the communication quality of the first communication path P1 that was measured by the telematics server 101. A second obtainment unit 300b obtains the communication quality of the second communication path P2 for connecting to the telematics server 101 via the communication IF 207, the smartphone 106, and the cellular network. The second obtainment unit 300b may include a second measurement unit 301b that measures the communication quality of the second communication path P2. The measurement method of the second measurement unit 301b may be the same as that of the first measurement unit 301a. Alternatively, the second obtainment unit 300b may receive, from the telematics server 101, quality information indicating the communication quality of the second communication path P2 that was measured by the telematics server 101.

Based on the communication quality of the first communication path P1 obtained by the first obtainment unit 300a and the communication quality of the second communication path P2 obtained by the second obtainment unit 300b, a communication path selection unit 302 selects a communication path with a superior communication quality from among the first communication path P1 and the second communication path P2.

Although both of the first obtainment unit 300a and the second obtainment unit 300b are installed in the CPU 201 in this example, one of them may be installed in the ECU 220. In this case, an IP address for the CPU 201 and an IP address for the ECU 220 may be allocated differently. This would make it possible to measure the communication quality of the first communication path P1 and the communication quality of the second communication path P2 substantially simultaneously.

A communication amount obtainment unit 303 and a refund request unit 304 are options. The communication amount obtainment unit 303 counts the amount of communication during communication with the telematics server 101 via the second communication path P2. In general, the telematics service is a flat-fee system and includes a communication fee as well. On the other hand, the communication fee of the smartphone 106 may be charged based on a pay-per-use system. Therefore, the company that provides the telematics service may refund, to the user, the communication fee that was borne by the user with respect to the second communication path P2. The refund request unit 304 may report refund information indicating the amount of communication obtained by the communication amount obtainment unit 303 to a refund processing unit 411 (FIG. 4)

of the telematics server 101. The refund request unit 304 may convert the amount of communication into the amount of refund, and report refund information indicating the amount of refund to the refund processing unit 411 of the telematics server 101. This would prevent the user from having to bear an additional burden related to the telematics service, even if the user has used the second communication path P2. This would be useful during the period of dissemination of the telematics service.

Telematics Server

Figure 4:
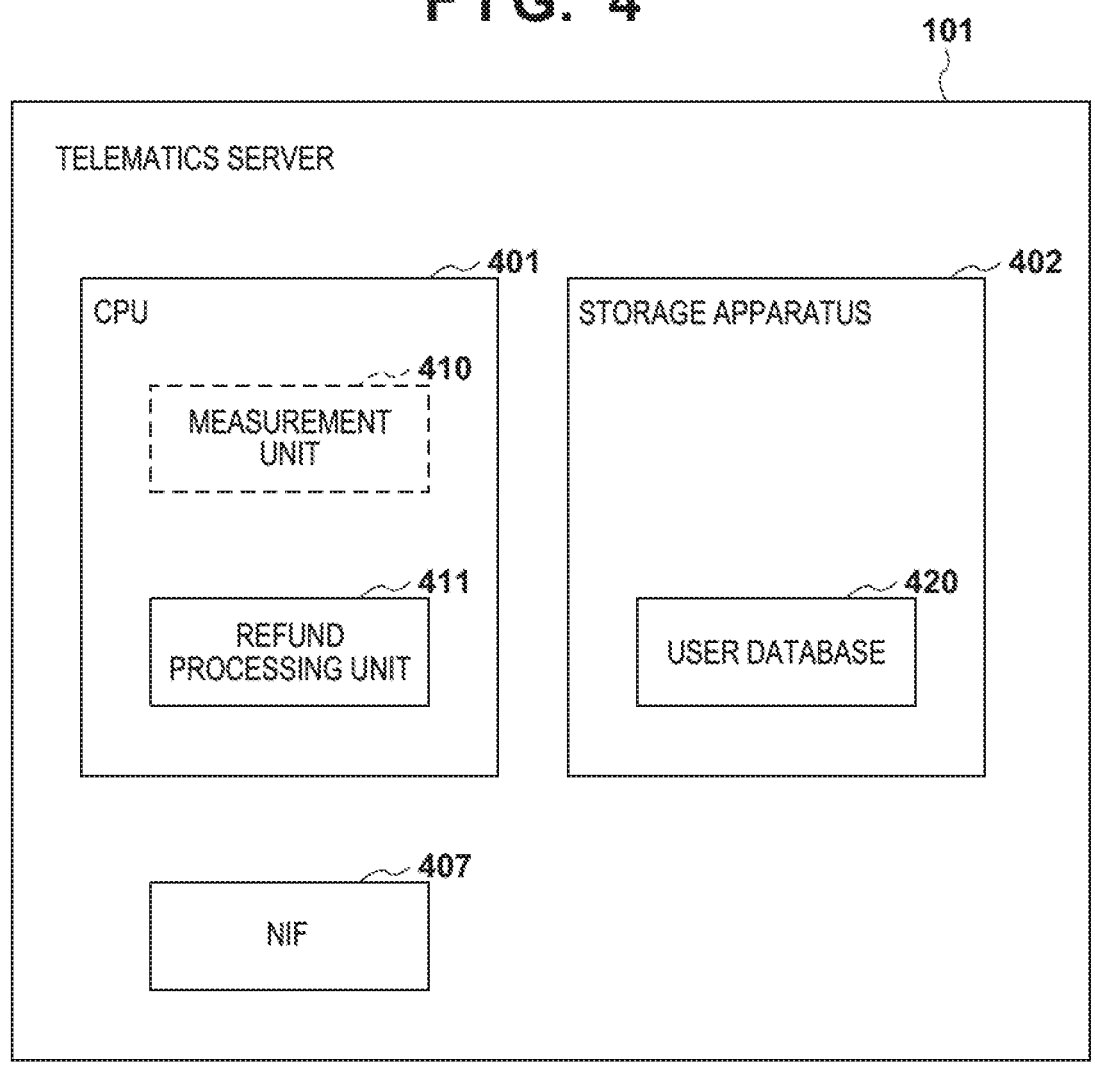
FIG. 4 is a diagram showing a telematics server.

FIG. 4 is a diagram showing the telematics server 101. The telematics server 101 is a server that is installed in a telematics center. A CPU 401 provides the telematics service to each vehicle by executing a control program stored in a storage apparatus 402. The storage apparatus 402 includes a RAM, a ROM, a hard disk drive, and the like. The CPU 401 may include a measurement unit 410 that measures the communication quality of the first communication path P1 and the communication quality of the second communication path P2. Upon receiving a measurement request from the first obtainment unit 300a, the measurement unit 410 measures the communication quality by transmitting ping to the vehicle 105 via the first communication path P1. Upon receiving a measurement request from the second obtainment unit 300b, the measurement unit 410 measures the communication quality by transmitting ping to the vehicle 105 via the second communication path P2. The measurement unit 410 may transmit data for measurement to the vehicle 105 in response to a measurement request from the vehicle 105, and assist the measurement of a communication speed based on a period required to complete the transmission, which is measured by the vehicle 105. Alternatively, the measurement unit 410 may receive data for measurement from the vehicle 105 in response to a measurement request from the vehicle 105, and measure a communication speed based on a period required for the reception. In this way, the measurement unit 410 may measure the communication qualities by itself, or may assist measurement processing of the first measurement unit 301a and the second measurement unit 301b.

The refund processing unit 411 may receive refund information (identification information of the user and the amount of communication or the amount of refund) from the vehicle 105, and write the refund information into a user database 420. An NIF 407 is a network interface for connecting to the network 102 and communicating with the vehicle 105.

Flowchart

Figure 5:
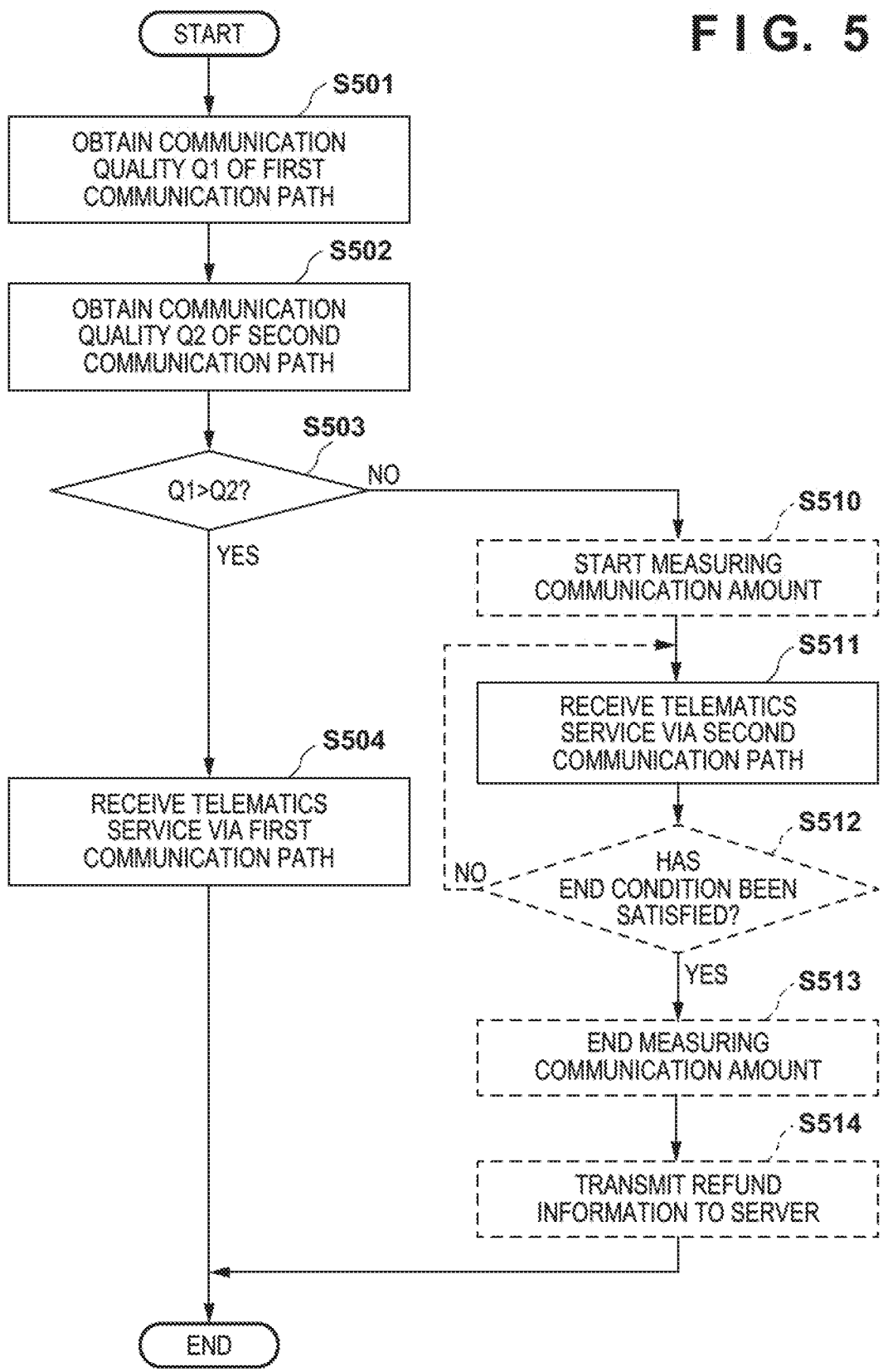
FIG. 5 is a flowchart showing processing for selecting a communication path.

FIG. 5 is a flowchart showing a communication method of the telematics service, including processing for selecting a communication path. The CPU 201 of the on-board device 200 may execute the following processing when starting communication of the telematics service, or when a communication error has occurred in the communication path that is currently used. Note that an SSID and an encryption key of Wi-Fi for tethering of the smartphone 106 may be set on the communication IF 207 in advance. Furthermore, the communication IF 207 and a Bluetooth® interface of the smartphone 106 may have been paired with each other for tethering.

In step S501, the CPU 201 (first obtainment unit 300a) obtains a communication quality Q1 of the first communication path P1. The first obtainment unit 300a causes the first measurement unit 301a to execute the measurement of the communication quality Q1, or receives a measurement result (communication quality Q1) from the measurement unit 410 of the telematics server 101.

In step S502, the CPU 201 (second obtainment unit 300b) obtains a communication quality Q2 of the second communication path P2. The second obtainment unit 300b causes the second measurement unit 301b to execute the measurement of the communication quality Q2, or receives a measurement result (communication quality Q2) from the measurement unit 410 of the telematics server 101. Note that the order of execution of steps S501 and S502 may be reversed, or steps S501 and S502 may be executed in parallel.

In step S503, the CPU 201 (communication path selection unit 302) determines whether the communication quality Q1 of the first communication path P1 exceeds the communication quality Q2 of the second communication path P2. Even if the communication quality Q2 of the second communication path P2 exceeds the communication quality Q1 of the first communication path P1, the first communication path P1 may be selected as long as the difference ΔQ therebetween is smaller than a threshold. In this way, the first communication path P1 is preferentially used; this would reduce an additional burden of a communication fee on the user attributed to the use of the second communication path P2. If the communication quality Q1 of the first communication path P1 exceeds the communication quality Q2 of the second communication path P2, the CPU 201 selects the first communication path P1 and proceeds to step S504.

In step S504, the CPU 201 connects to the telematics server 101 via the TCU 205, and receives the telematics service from the telematics server 101 via the first communication path P1. That is to say, the CPU 201 receives, for example, information necessary for automated driving (e.g., map information and traffic information around the vehicle) and/or entertainment information (e.g., moving images and music) via the first communication path P1. The CPU 201 may also transmit travel data of the vehicle 105 obtained by the ECU 220 to the telematics server 101.

On the other hand, if the communication quality Q1 of the first communication path P1 does not exceed the communication quality Q2 of the second communication path P2 in step S503, the CPU 201 selects the second communication path P2 and proceeds to step S510.

In step S510, the CPU 201 (communication amount obtainment unit 303) starts measuring a communication amount associated with communication with the telematics server 101 via the second communication path P2. Note that step S510 and steps S512 to S514 are options.

In step S511, the CPU 201 connects to the telematics server 101 via the communication IF 207, and receives the telematics service from the telematics server 101 via the second communication path P2. That is to say, the CPU 201 receives, for example, information necessary for automated driving (e.g., map information and traffic information around the vehicle) and/or entertainment information (e.g., moving images and music) via the second communication path P2. The CPU 201 may also transmit travel data of the vehicle 105 obtained by the ECU 220 to the telematics server 101.

In step S512, the CPU 201 determines whether a condition for ending communication of the telematics service using the second communication path P2 has been satisfied. Such a condition for ending may be recovery of the communication quality Q1 of the first communication path P1, or parking of the vehicle 105 in a parking lot and the like (ignition OFF). If the condition for ending has been satisfied, the CPU 201 proceeds to step S513.

In step S513, the CPU 201 (communication amount obtainment unit 303) ends the measurement of the communication amount.

In step S514, the CPU 201 (refund request unit 304) transmits refund information (identification information of the user and the amount of communication or the amount of refund) to the telematics server 101.

<First Exemplary Modification>

Figure 6A:
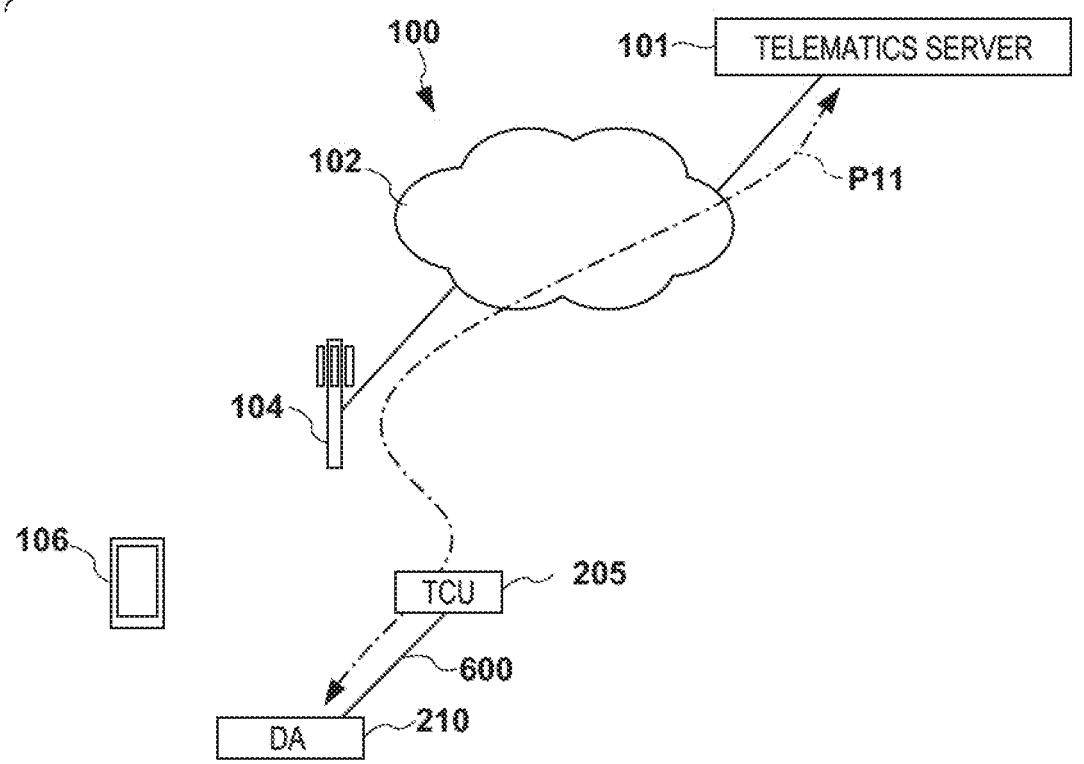
FIGS. 6A and 6B are diagrams illustrating other communication paths.

FIG. 6A shows a communication path P11 that is intended for the DA 210 to connect to the telematics server 101 via the TCU 205 and the cellular base station 104. The telematics base station 103 may be realized by the cellular base station 104. Alternatively, the TCU 205 may include a communication IF for communication with the cellular base station 104.

The DA 210 may be the ECU 220. The TCU 205 functions as one type of access point, and a global IP address is allocated to the TCU 205 by the cellular base station 104. Furthermore, the TCU 205 allocates a local IP address to the DA 210. The TCU 205 and the DA 210 are wire-connected by a wire harness 600.

Here, there may be a case where the wire harness 600 is disconnected or the wire harness 600 is contaminated with exogenous noise. In this case, the DA 210 becomes incapable of communicating with the TCU 205 via the wire harness 600, or even if the communication is possible, the communication quality of the communication path P11 would fall below a threshold.

Figure 6B:
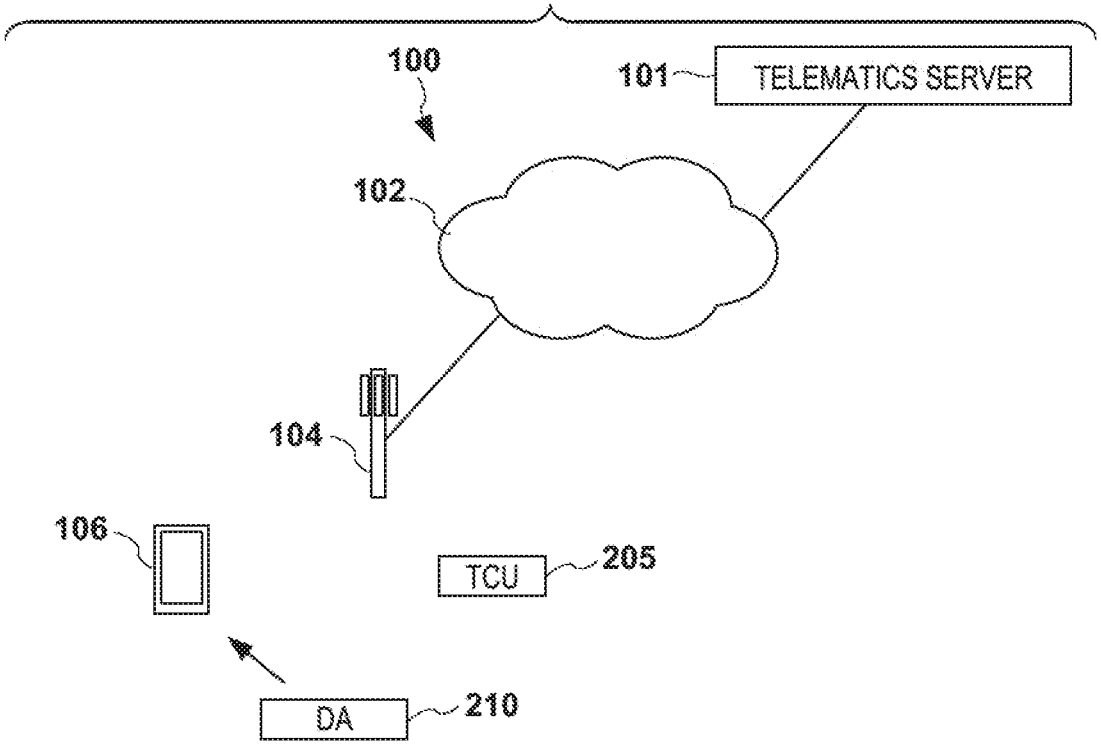

In view of this, as shown in FIG. 6B, the CPU 201 of the DA 210 discards the local IP address allocated by the TCU 205, and connects to the smartphone 106 via the communication IF 207. The smartphone 106, which has the tethering function according to Bluetooth®, allocates a local IP address to the DA 210 via the Bluetooth® interface. It is assumed that settings for pairing between the communication IF 207 and the smartphone 106 have been configured in advance. The CPU 201 of the DA 210 notifies the smartphone 106 of an SSID and a security key of the TCU 205, and instincts the smartphone 106 to establish a Wi-Fi connection with the TCU 205. The smartphone 106 connects to the TCU 205 based on the SSID and the security key of the TCU 205, and the TCU 205 allocates a local IP address to the smartphone 106. In the foregoing manner, each of the smartphone 106 and the TCU 205 functions as an access point.

Figure 7:
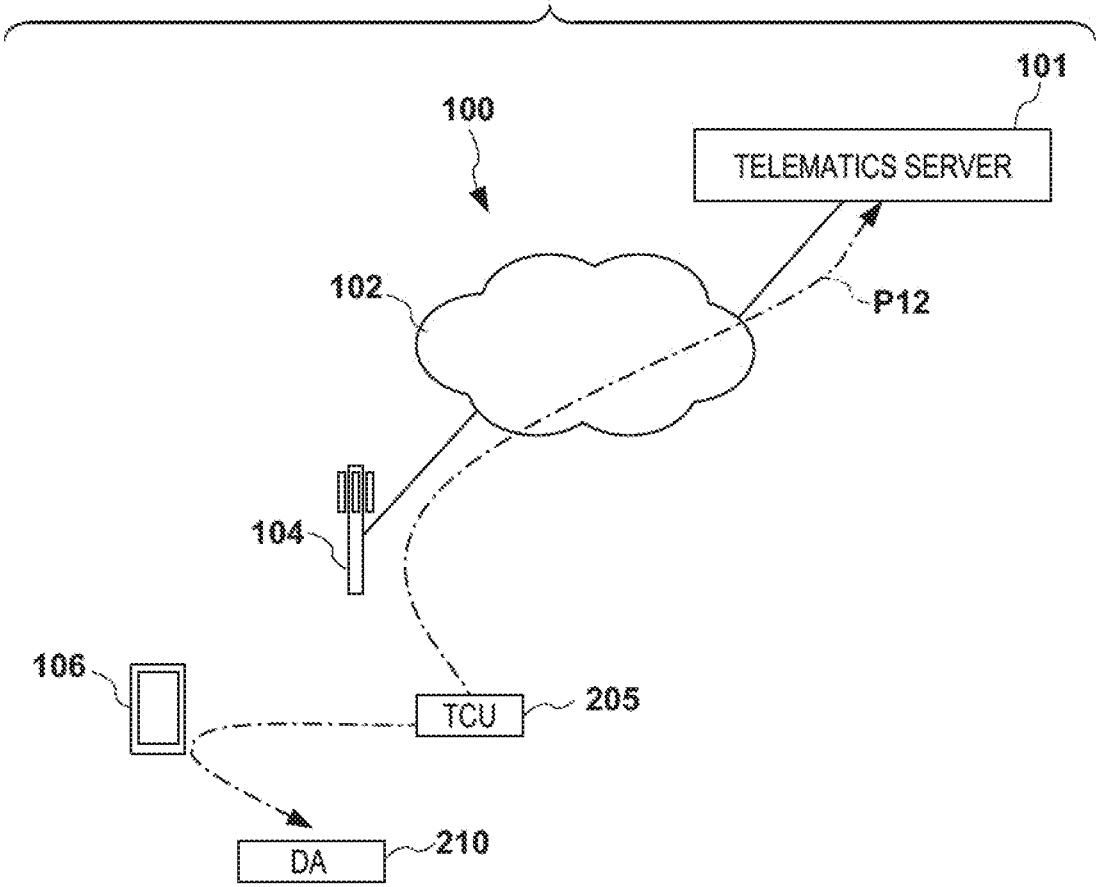
FIG. 7 is a diagram illustrating other communication paths.

As shown in FIG. 7, the DA 210 connects to the telematics server 101 via the smartphone 106, TCU 205, and cellular base station 104. That is to say, switching from the communication path P11 to a communication path P12 enables the DA 210 to continue communication with the telematics server 101. The CPU 201 may select one of the communication paths by comparing the communication quality of the communication path P11 with the communication quality of the communication path P12. For example, if the communication quality of the communication path P12 is superior to the communication quality of the communication path P11, the CPU 201 continues communication using the communication path P12. If the communication quality of the communication path P11 is superior to the communication quality of the communication path P12, the CPU 201 may switch from the communication path P12 back to the communication path P11.

<Second Exemplary Modification>

Figure 8:
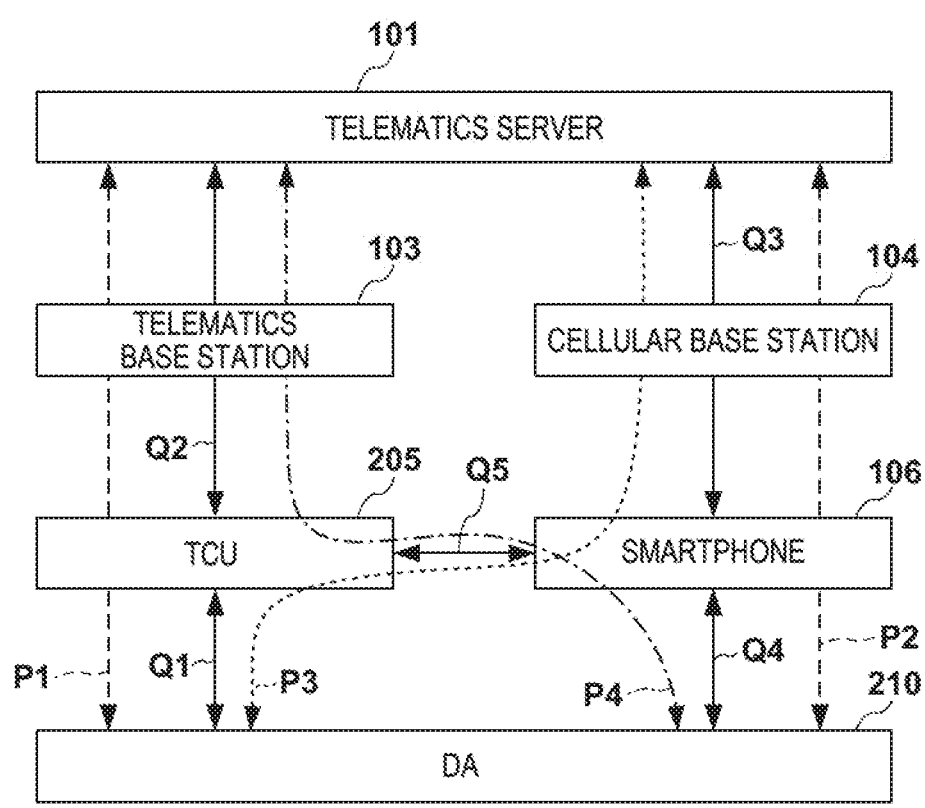
FIG. 8 is a diagram illustrating a method of obtaining the communication qualities of a plurality of communication sections that compose communication paths.

FIG. 8 shows a method of selecting a communication path with a superior communication quality from among a plurality of communication paths P1 to P4. As the method of obtaining the communication qualities of the communication paths P1 and P2 has already been described, the following describes a method of measuring the communication qualities of the communication paths P3 and P4.

It is assumed that the CPU 201 is connected via the TCU 205 and the telematics base station 103. The CPU 201 measures a communication quality Q1 by executing PING with respect to the TCU 205. The CPU 201 also instructs the TCU 205 to execute PING with respect to the telematics server 101. For example, the CPU 201 transmits an IP address of the telematics server 101, as well as a command for executing PING with respect to this IP address, to an IP address of the TCU 205. Upon receiving this command, the TCU 205 measures a communication quality Q2 by executing PING with respect to the IP address of the telematics server 101. The TCU 205 reports the communication quality Q2 to the CPU 201.

Next, the CPU 201 instructs the TCU 205 to establish a Wi-Fi connection with the smartphone 106 by giving notification of an SSID and a security key of the smartphone 106. The TCU 205 connects to the smartphone 106 based on the SSID and security key of the smartphone 106. The smartphone 106 notifies the TCU 205 of its own IP address, and also allocates a local IP address to the TCU 205. Upon perceiving the IP address of the smartphone 106, the TCU 205 obtains a communication quality Q5 by executing PING with respect to this IP address.

Next, the CPU 201 discards a local IP address allocated by the TCU 205, and establishes a Wi-Fi connection with the smartphone 106 via the communication IF 207. The smartphone 106 allocates a local IP address to the CPU 201 of the DA 210 via the communication IF 207, and also gives notification of its own IP address. The CPU 201 obtains a communication quality Q4 by executing PING with respect to the IP address of the smartphone 106. Furthermore, the CPU 201 transmits the IP address of the telematics server 101, as well as a command for executing PING with respect to this IP address, to the IP address of the smartphone 106. Upon receiving this command, the smartphone 106 measures a communication quality Q3 by executing PING with respect to the IP address of the telematics server 101. The smartphone 106 reports the communication quality Q3 to the CPU 201.

In this way, the communication quality of the communication path P3 can be represented by the communication qualities Q1, Q3, and Q5. Similarly, the communication quality of the communication path P4 can be represented by the communication qualities Q2, Q4, and Q5. When the communication qualities Q1 to Q5 are simply round-trip delay times, the communication quality of the communication path P3 is computed by summing the communication qualities Q1, Q3, and Q5. The communication quality of the communication path P4 is computed by summing the communication qualities Q2, Q4, and Q5. The CPU 201 (communication path selection unit 302) may select a communication path with a superior communication quality by comparing the communication qualities of the communication paths P1 to P4.

Note that the obtainment of the communication qualities Q1 to Q5 may be executed by one of the first obtainment unit 300a and the second obtainment unit 300b, or may be executed by coordination between the first obtainment unit 300a and the second obtainment unit 300b. Alternatively, a third obtainment unit that obtains the communication quality Q1, a fourth obtainment unit that obtains the communication quality Q2, a fifth obtainment unit that obtains the communication quality Q3, a sixth obtainment unit that obtains the communication quality Q4, and a seventh obtainment unit that obtains the communication quality Q5 may be used. Furthermore, the TCU 205 may include a measurement unit that is intended to receive a command from the CPU 201, execute PING, and report a measurement result (communication qualities Q2 and Q5) to the CPU 201. Similarly, the smartphone 106 may include a measurement unit that is intended to receive a command from the CPU 201, execute PING, and report a measurement result (communication qualities Q3 and Q5) to the CPU 201.

<Summary>

[First Aspect]

The vehicle 105 may be configured as follows. The TCU 205 is one example of a telematics control unit that communicates with a telematics server, which provides a telematics service, via a base station (e.g., the telematics base station 103 or the cellular base station 104). The smartphone 106 is one example of a wireless communication terminal (user terminal) connected to a cellular network. The communication IF 207 is one example of a communication interface for communication with the wireless communication terminal. The first obtainment unit 300a is one example of a first obtainment unit that obtains a communication quality of a first communication path for connecting to the telematics server via the telematics control unit and the base station. The second obtainment unit 300b is one example of a second obtainment unit that obtains a communication quality of a second communication path for connecting to the telematics server via the communication interface, the wireless communication terminal, and the cellular network. The communication path selection unit 302 is one example of a selection unit that selects a communication path with a superior communication quality from among the first communication path and the second communication path based on the communication quality of the first communication path obtained by the first obtainment unit and the communication quality of the second communication path obtained by the second obtainment unit. As set forth above, when, for example, the communication quality of a dedicated line for the telematics service has dropped, the present embodiment enables the vehicle to continue communication with the telematics service via the wireless communication terminal (user terminal) owned by a user. This would improve convenience for a user who uses the telematics service.

[Second Aspect]

The communication qualities may be at least one of a communication speed and/or communication delay time. As these measures of quality can be obtained relatively easily, it would become easier to implement the invention of the present application. Each measurement unit may calculate one evaluation value from a plurality of measures of communication, and use the calculated evaluation value as a communication quality. A conversion expression for converting the plurality of measures of communication (a communication speed and communication delay time) into the evaluation value is calculated in advance and stored in the memory or the storage apparatus.

[Third Aspect]

The first obtainment unit may include a first measurement unit that measures the communication quality of the first communication path.

[Fourth Aspect]

The first obtainment unit may receive, from the telematics server, quality information indicating the communication quality of the first communication path measured by the telematics server.

[Fifth Aspect]

The second obtainment unit may include a second measurement unit that measures the communication quality of the second communication path.

[Sixth Aspect]

The second obtainment unit may receive, from the telematics server, quality information indicating the communication quality of the second communication path measured by the telematics server.

[Seventh Aspect]

The first measurement unit may be installed in an infotainment unit or an electronic control unit (ECU). The first measurement unit may transmit ping using a first IP address allocated by the TCU 205 as a source address.

[Eighth Aspect]

The second measurement unit may be installed in an electronic control unit (ECU) or an infotainment unit. The second measurement unit may transmit ping using a second IP address allocated by the communication IF 207 as a source address. The first IP address and the second IP address are different from each other. This enables the measurement of the communication quality Q1 of the first communication path P1 and the measurement of the communication quality Q2 of the second communication path P2 to be executed simultaneously.

[Ninth Aspect]

The communication amount obtainment unit 303 may function as a measurement unit that, when the selection unit has selected the second communication path, measures a communication amount of the wireless communication terminal for relaying the telematics service. The refund request unit 304 may function as a transmission unit that transmits the communication amount measured by the measurement unit to a refund processing unit of the telematics server. This would reduce a burden on the user associated with the use of the second communication path P2.

[Tenth Aspect]

The input apparatus 204 may function as an acceptance unit that accepts designation of one of a first mode, a second mode, and a third mode, the first mode using only the first communication path, the second mode using only the second communication path, the third mode selecting a communication path from among the first communication path and the second communication path in accordance with the communication qualities. The communication path selection unit 302 may select the first communication path when the acceptance unit has accepted designation of the first mode, select the second communication path when the acceptance unit has accepted designation of the second mode, and select a communication path with a superior communication quality from among the first communication path and the second communication path when the acceptance unit has accepted designation of the third mode. In this way, the preference of the user can be reflected in the selection of a communication path. For example, some users may silently accept a reduction in the convenience of the telematics service to stay away from the occurrence of an additional burden. Also, some users may wish to select the second communication path to preferentially receive a more stable telematics service. Furthermore, some users may wish to receive the telematics service while taking advantage of both of the first communication path and the second communication path. Therefore, such individual circumstances of the user may be reflected in the selection of a communication path.

[Eleventh Aspect]

The wireless communication terminal may be a smartphone having a tethering function. The replacement cycle for smartphones is often short compared with the replacement cycle for vehicles. Therefore, there may be case where the communication performance of the smartphone 106 is higher than the communication performance of the TCU 205. In this case, the user may aggressively wish to receive the telematics service with the use of the smartphone 106.

[Twelfth Aspect]

The first obtainment unit 300a may be configured to obtain a communication quality of a third communication path for connecting to the telematics server via the telematics control unit, the wireless communication terminal, and the cellular network. The selection unit may be configured to select a communication path with a superior communication quality from among the first communication path, the second communication path, and the third communication path based on the communication quality of the first communication path, the communication quality of the second communication path, and the communication quality of the third communication path. In this way, the range of choices of communication paths would broaden, and a more favorable communication path would be selected.

[Thirteenth Aspect]

The second obtainment unit 300b may be configured to obtain a communication quality of a fourth communication path for connecting to the telematics server via the communication interface, the wireless communication terminal, the telematics control unit, and the base station. The selection unit may be configured to select a communication path with a superior communication quality from among the first communication path, the second communication path, and the fourth communication path based on the communication quality of the first communication path, the communication quality of the second communication path, and the communication quality of the fourth communication path. In this way, the range of choices of communication paths would broaden, and a more favorable communication path would be selected.

[Fourteenth Aspect]

The first obtainment unit 300a may be configured to obtain a communication quality of a third communication path for connecting to the telematics server via the telematics control unit, the wireless communication terminal, and the cellular network. The second obtainment unit 300b may be configured to obtain a communication quality of a fourth communication path for connecting to the telematics server via the communication interface, the wireless communication terminal, the telematics control unit, and the base station. The selection unit may be configured to select a communication path with a superior communication quality from among the first communication path, the second communication path, the third communication path, and the fourth communication path based on the communication quality of the first communication path, the communication quality of the second communication path, the communication quality of the third communication path, and the communication quality of the fourth communication path. In this way, the range of choices of communication paths would broaden, and a more favorable communication path would be selected.

[Fifteenth Aspect]

The present embodiment provides an on-board device comprising: a telematics control unit that communicates with a telematics server, which provides a telematics service, via a base station; a wireless communication terminal connected to a cellular network; a communication interface for communication with the wireless communication terminal; a first obtainment unit that obtains a communication quality of a first communication path for connecting to the telematics server via the telematics control unit and the base station, a second obtainment unit that obtains a communication quality of a second communication path for connecting to the telematics server via the communication interface, the wireless communication terminal, and the cellular network, and a selection unit that selects a communication path with a superior communication quality from among the first communication path and the second communication path based on the communication quality of the first communication path obtained by the first obtainment unit and the communication quality of the second communication path obtained by the second obtainment unit.

The invention is not limited to the foregoing embodiments, and various variations/changes are possible within the spirit of the invention.

What is claimed is:

1. A vehicle comprising:
a telematics control unit configured to communicate with a telematics server via a base station;
a communication interface for communication with a wireless communication terminal connected to a cellular network;
a first obtainment circuit configured to obtain a communication quality of a first communication path for connecting to the telematics server via the telematics control unit and the base station;
a second obtainment circuit configured to obtain a communication quality of a second communication path for connecting to the telematics server via the communication interface, the wireless communication terminal, and the cellular network;
a selection circuit configured to select a communication path with a superior communication quality from among the first communication path and the second communication path based on the communication quality of the first communication path obtained by the first obtainment circuit and the communication quality of the second communication path obtained by the second obtainment circuit;
a measurement circuit configured to, when the selection circuit has selected the second communication path, measure a communication amount of the wireless communication terminal for relaying a telematics service; and
a transmission circuit configured to transmit the communication amount measured by the measurement circuit to a refund processing circuit of the telematics server.

2. The vehicle according to claim 1,
wherein the communication qualities are at least one of a communication speed, communication delay time, and/or throughput.

3. The vehicle according to claim 1,
wherein the first obtainment circuit includes a first measurement circuit configured to measure the communication quality of the first communication path.

4. The vehicle according to claim 1,
wherein the first obtainment circuit receives, from the telematics server, quality information indicating the communication quality of the first communication path measured by the telematics server.

5. The vehicle according to claim 1,
wherein the second obtainment circuit includes a second measurement circuit configured to measure the communication quality of the second communication path.

6. The vehicle according to claim 1,
wherein the second obtainment circuit receives, from the telematics server, quality information indicating the communication quality of the second communication path measured by the telematics server.

7. The vehicle according to claim 3,
wherein the first measurement circuit is included in an infotainment circuit or an electronic control unit (ECU).

8. The vehicle according to claim 5,
wherein the second measurement circuit is included in an electronic control unit (ECU) or an infotainment circuit.

9. The vehicle according to claim 1, further comprising
an acceptance circuit configured to accept designation of one of a first mode, a second mode, and a third mode, the first mode using only the first communication path, the second mode using only the second communication path, the third mode selecting a communication path from among the first communication path and the second communication path in accordance with the communication qualities,
wherein the selection circuit
selects the first communication path when the acceptance circuit has accepted designation of the first mode,
selects the second communication path when the acceptance circuit has accepted designation of the second mode, and
selects a communication path with a superior communication quality from among the first communication path and the second communication path when the acceptance circuit has accepted designation of the third mode.

10. The vehicle according to claim 1,
wherein the wireless communication terminal is a smartphone having a tethering function.

11. The vehicle according to claim 1, wherein
the first obtainment circuit is configured to obtain a communication quality of a third communication path for connecting to the telematics server via the telematics control unit, the wireless communication terminal, and the cellular network, and
the selection circuit is configured to select a communication path with a superior communication quality from among the first communication path, the second communication path, and the third communication path based on the communication quality of the first communication path, the communication quality of the second communication path, and the communication quality of the third communication path.

12. The vehicle according to claim 1, wherein
the second obtainment circuit is configured to obtain a communication quality of a fourth communication path for connecting to the telematics server via the communication interface, the wireless communication terminal, the telematics control unit, and the base station, and
the selection circuit is configured to select a communication path with a superior communication quality from among the first communication path, the second communication path, and the fourth communication path based on the communication quality of the first communication path, the communication quality of the second communication path, and the communication quality of the fourth communication path.

13. The vehicle according to claim 1, wherein
the first obtainment circuit is configured to obtain a communication quality of a third communication path for connecting to the telematics server via the telematics control unit, the wireless communication terminal, and the cellular network,
the second obtainment circuit is configured to obtain a communication quality of a fourth communication path for connecting to the telematics server via the communication interface, the wireless communication terminal, the telematics control unit, and the base station, and
the selection circuit is configured to select a communication path with a superior communication quality from among the first communication path, the second communication path, the third communication path, and the fourth communication path based on the communication quality of the first communication path, the communication quality of the second communication path, the communication quality of the third communication path, and the communication quality of the fourth communication path.

14. An on-board device comprising:
a telematics control unit configured to communicate with a telematics server via a base station, the telematics server providing a telematics service;
a communication interface for communication with a wireless communication terminal connected to a cellular network;
a first obtainment circuit configured to obtain a communication quality of a first communication path for connecting to the telematics server via the telematics control unit and the base station;
a second obtainment circuit configured to obtain a communication quality of a second communication path for connecting to the telematics server via the communication interface, the wireless communication terminal, and the cellular network;
a selection circuit configured to select a communication path with a superior communication quality from among the first communication path and the second communication path based on the communication quality of the first communication path obtained by the first obtainment circuit and the communication quality of the second communication path obtained by the second obtainment circuit;
a measurement circuit configured to, when the selection circuit has selected the second communication path, measure a communication amount of the wireless communication terminal for relaying a telematics service; and
a transmission circuit configured to transmit the communication amount measured by the measurement circuit to a refund processing circuit of the telematics server.

15. A vehicle comprising:
a telematics control unit configured to communicate with a telematics server via a base station;
a communication interface for communication with a wireless communication terminal connected to a cellular network;
a first obtainment circuit configured to obtain a communication quality of a first communication path for connecting to the telematics server via the telematics control unit and the base station;
a second obtainment circuit configured to obtain a communication quality of a second communication path for connecting to the telematics server via the communication interface, the wireless communication terminal, and the cellular network;
a selection circuit configured to select a communication path with a superior communication quality from among the first communication path and the second communication path based on the communication quality of the first communication path obtained by the first obtainment circuit and the communication quality of the second communication path obtained by the second obtainment circuit;

an acceptance circuit configured to accept designation of one of a first mode, a second mode, and a third mode, the first mode using only the first communication path, the second mode using only the second communication path, the third mode selecting a communication path from among the first communication path and the second communication path in accordance with the communication qualities, wherein the selection circuit selects the first communication path when the acceptance circuit has accepted designation of the first mode, selects the second communication path when the acceptance circuit has accepted designation of the second mode, and selects a communication path with a superior communication quality from among the first communication path and the second communication path when the acceptance circuit has accepted designation of the third mode.

16. An on-board device comprising:

a telematics control unit configured to communicate with a telematics server via a base station, the telematics server providing a telematics service;

a communication interface for communication with a wireless communication terminal connected to a cellular network;

a first obtainment circuit configured to obtain a communication quality of a first communication path for connecting to the telematics server via the telematics control unit and the base station;

a second obtainment circuit configured to obtain a communication quality of a second communication path for connecting to the telematics server via the communication interface, the wireless communication terminal, and the cellular network;

a selection circuit configured to select a communication path with a superior communication quality from among the first communication path and the second communication path based on the communication quality of the first communication path obtained by the first obtainment circuit and the communication quality of the second communication path obtained by the second obtainment circuit; and an acceptance circuit configured to accept designation of one of a first mode, a second mode, and a third mode, the first mode using only the first communication path, the second mode using only the second communication path, the third mode selecting a communication path from among the first communication path and the second communication path in accordance with the communication qualities, wherein the selection circuit selects the first communication path when the acceptance circuit has accepted designation of the first mode, selects the second communication path when the acceptance circuit has accepted designation of the second mode, and selects a communication path with a superior communication quality from among the first communication path and the second communication path when the acceptance circuit has accepted designation of the third mode.

* * * * *